(12) United States Patent
Salah et al.

(10) Patent No.: US 12,413,341 B2
(45) Date of Patent: Sep. 9, 2025

(54) METHOD AND APPARATUS FOR PUCCH CARRIER SWITCHING AND PUCCH REPETITION IN MOBILE COMMUNICATIONS

(71) Applicant: MediaTek Singapore Pte. Ltd., Singapore (SG)

(72) Inventors: Abdellatif Salah, Cambridge (GB); Mohammed S Aleabe Al-Imari, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 266 days.

(21) Appl. No.: 17/954,478

(22) Filed: Sep. 28, 2022

(65) Prior Publication Data
US 2023/0116002 A1  Apr. 13, 2023

Related U.S. Application Data

(60) Provisional application No. 63/254,580, filed on Oct. 12, 2021.

(51) Int. Cl.
| | |
|---|---|
| *H04L 1/08* | (2006.01) |
| *H04W 72/21* | (2023.01) |
| *H04W 72/23* | (2023.01) |

(52) U.S. Cl.
CPC .............. *H04L 1/08* (2013.01); *H04W 72/21* (2023.01); *H04W 72/23* (2023.01)

(58) Field of Classification Search
None
See application file for complete search history.

(56) References Cited

U.S. PATENT DOCUMENTS

| | | | |
|---|---|---|---|
| 2021/0084622 A1 | 3/2021 | Choi et al. | |
| 2022/0104138 A1* | 3/2022 | Park | H04W 72/0473 |
| 2022/0330213 A1* | 10/2022 | Lee | H04L 1/1864 |
| 2023/0041930 A1* | 2/2023 | Taherzadeh Boroujeni | H04L 1/1858 |
| 2023/0100345 A1* | 3/2023 | Ly | H04W 72/0453 370/329 |

(Continued)

OTHER PUBLICATIONS

Taiwan Intellectual Property Office, Office Action for Taiwan Patent Application No. 111138597, Jan. 10, 2023.

(Continued)

*Primary Examiner* — Xavier S Wong
(74) *Attorney, Agent, or Firm* — Andy M. Han; Han IP PLLC

(57) ABSTRACT

Various solutions for PUCCH carrier switching and PUCCH repetition with respect to user equipment and network apparatus in mobile communications are described. An apparatus may receive downlink control information (DCI) on a physical downlink control channel (PDCCH) configuring a carrier switching indication and a PUCCH repetition indication. The apparatus may receive downlink data on a physical downlink shared channel (PDSCH). The apparatus may perform a PUCCH carrier switching or a PUCCH cell switching according to the carrier switching indication when transmitting uplink control information (UCI) corresponding to the downlink data. The apparatus may perform a PUCCH repetition by retransmitting the UCI according to the PUCCH repetition indication.

15 Claims, 5 Drawing Sheets

(56) References Cited

U.S. PATENT DOCUMENTS

| | | | | |
|---|---|---|---|---|
| 2023/0164826 A1* | 5/2023 | Zhang | ................... | H04L 1/00 |
| | | | | 370/329 |
| 2023/0379095 A1* | 11/2023 | Kittichokechai | ..... | H04L 5/0035 |
| 2024/0205908 A1* | 6/2024 | Li | ..................... | H04W 72/23 |
| 2024/0340863 A1* | 10/2024 | Takahashi | ............ | H04L 5/0053 |

OTHER PUBLICATIONS

ASUSTEK, "Discussion on PUCCH carrier switch for HARQ-ACK enhancement", 3GPP TSG RAN WG1 #106bis-e, R1-2110287, e-Meeting, Oct. 11-19, 2021.
European Patent Office, Extended European Search Report for European Patent Application No. 22200321.2, Mar. 15, 2023.
Huawei et al.: "UE feedback enhancements for HARQ-ACK", 3GPP TSG RAN WG1 Meeting #106-e, R1-2106490, E-meeting, Aug. 16-27, 2021.
NTT DOCOMO, Inc.: "Discussion on HARQ-ACK feedback enhancements for Rel. 17 URLLC", 3GPP TSG RAN WG1 106bis-e, R1-2109671, e-Meeting, Oct. 11-19, 2021.

* cited by examiner

METHOD AND APPARATUS FOR PUCCH CARRIER SWITCHING AND PUCCH REPETITION IN MOBILE COMMUNICATIONS

CROSS REFERENCE TO RELATED PATENT APPLICATION(S)

The present disclosure is part of a non-provisional application claiming the priority benefit of U.S. Provisional Patent Application No. U.S. Ser. No. 63/254,580, filed 12 Oct. 2021, the content of which being incorporated by reference in its entirety.

TECHNICAL FIELD

The present disclosure is generally related to mobile communications and, more particularly, to PUCCH carrier switching and PUCCH repetitions for latency enhancement and UCI transmission enhancement with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE) or New Radio (NR), hybrid automatic repeat request-acknowledgement (HARQ-ACK) information transmission is introduced to improve transmission reliability and robustness. The user equipment (UE) needs to report HARQ-ACK information for corresponding downlink receptions in a HARQ-ACK codebook. The HARQ-ACK codebook should be transmitted in a slot indicated by a value of a HARQ feedback timing indicator field in a corresponding downlink control information (DCI) format. The DCI format should also indicate the physical uplink control channel (PUCCH) resource scheduled for the HARQ-ACK information transmission. HARQ-ACK multiplexing can be used to facilitate HARQ-ACK information transmission. Multiple HARQ-ACK feedbacks corresponding to multiple physical downlink shared channel (PDSCH) transmissions may be accumulated, multiplexed and transmitted to the network apparatus at once. One PUCCH resource may be used to carry multiple HARQ-ACK feedbacks to be transmitted in the same slot.

The current framework of transmission of HARQ feedback bits is not suitable for URLLC. URLLC is introduced for emerging applications that demands high requirements on end-to-end latency and reliability. A general URLLC requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. For example, the control reliability of URLLC has to be stricter than the data reliability which is up to $10^{-6}$ BLER. Accordingly, allowing only one PUCCH resource for HARQ feedback bits transmission in an uplink slot will add to transmission latency.

On the other hand, multi-link operation is introduced to increase system capacity and transmission efficiency of the communication systems. Multi-link operation can be implemented by carrier aggregation (CA) or dual connectivity (DC), where additional links are used to increase the amount of data that can be transferred to and from the UE. The UE can be configured with more than one radio links (e.g., component carriers) and can connect to more than one network nodes (e.g., serving cells). Under the framework of CA, cross-carrier scheduling is supported to improve transmission efficiency and reduce latency. Cross-carrier scheduling enables the UE to connect to different network nodes for receiving the downlink data on different carriers. Cross-carrier scheduling may also be used to balance the loads from traffic and scheduling across different component carriers. Without cross-carrier scheduling, the downlink scheduling assignments on physical downlink control channel (PDCCH) are only valid for the component carrier (CC) on which they were transmitted. With cross-carrier scheduling, the downlink scheduling assignments can be received on a CC other than the one on which PDCCH is received.

In $3^{rd}$ Generation Partnership Project (3GPP) Release 16, uplink (UL) transmit (Tx) switching is introduced as a new feature to enhance dual connectivity (EN-DC), carrier aggregation (CA) and supplementary uplink (SUL). In 3GPP Release 17, cross-carrier scheduling using dynamic indication or semi-static configuration for uplink control information (UCI) transmission (e.g., PUCCH) have been specified. PUCCH carrier switching is supported based on dynamic indication and semi-static configuration. However, dynamic indication and semi-static configuration are subjected to separate UE capabilities.

In addition, PUCCH repetitions is an existing feature in NR that essential for the reliability of the PUCCH transmission. If PUCCH repetition is supported for PUCCH cell switching, latency and reliability of transmitting UCI can be reduced and enhanced.

Accordingly, how to reduce alignment delay/latency and enhance reliability is an important issue for URLLC or other latency-critical applications in the newly developed wireless communication network. Therefore, there is a need to provide proper cross-carrier scheduling and repetition mechanisms and UCI transmission enhancement for better performance when URLLC is supported.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to PUCCH carrier switching and PUCCH repetitions for latency reduction and UCI transmission enhancement with respect to user equipment and network apparatus in mobile communications.

In one aspect, a method may involve an apparatus receiving downlink control information (DCI) on a physical downlink control channel (PDCCH) configuring a carrier switching indication and a PUCCH repetition indication. The method may also involve the apparatus receiving downlink data on a physical downlink shared channel (PDSCH). The method may further involve the apparatus performing a PUCCH carrier switching or a PUCCH cell switching according to the carrier switching indication when transmitting uplink control information (UCI) corresponding to the downlink data. The method may further involve the apparatus performing a PUCCH repetition by retransmitting the UCI according to the PUCCH repetition indication.

In one aspect, a method may involve an apparatus receiving a physical downlink control channel (PDCCH). The method may also involve the apparatus receiving downlink data on a physical downlink shared channel (PDSCH) according to the PDCCH. The method may further involve the apparatus performing a PUCCH repetition corresponding to the PDSCH according to a restriction. The restriction includes no semi-static PUCCH carrier switching or no semi-static PUCCH cell switching for the PUCCH repetition.

In one aspect, an apparatus may include a transceiver and a processor coupled to the transceiver. The transceiver may be configured to wirelessly communicate with a network node of a wireless network. The processor may be configured to receive, via the transceiver, a downlink control information (DCI) on a physical downlink control channel (PDCCH) configuring a carrier switching indication and a PUCCH repetition indication. The processor may also be configured to receive, via the transceiver, downlink data on a physical downlink shared channel (PDSCH). The processor may be further configured to perform a PUCCH carrier switching or a PUCCH cell switching according to the carrier switching indication when transmitting uplink control information (UCI) corresponding to the downlink data. The processor may be further configured to perform a PUCCH repetition by retransmitting the UCI according to the PUCCH repetition indication.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
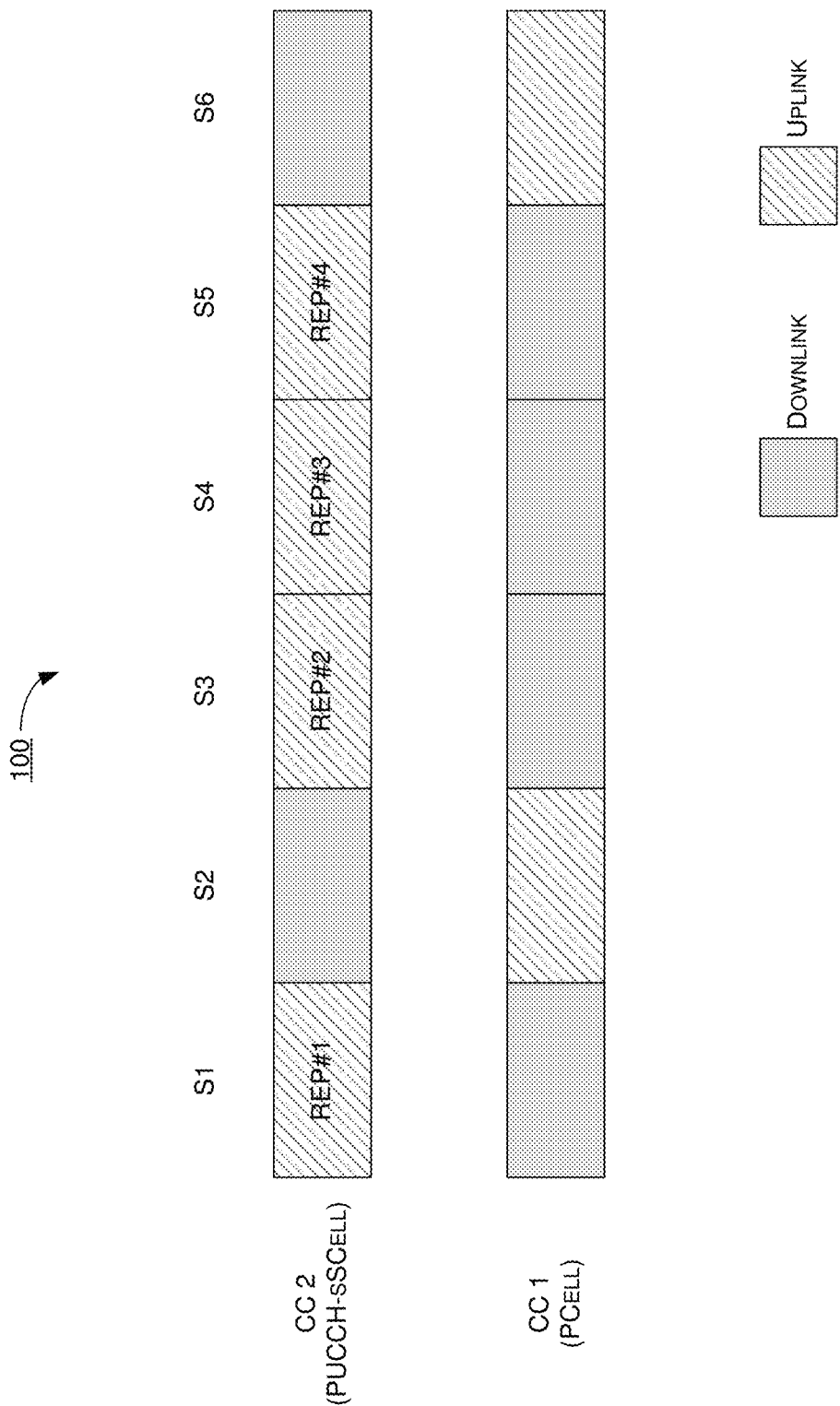
FIG. 1 is a diagram depicting an example scenario under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to PUCCH carrier/cell switching and PUCCH repetitions for latency reduction and UCI transmission enhancement with respect to user equipment (UE) and network apparatus in mobile communications. According to the present disclosure, a number of possible solutions may be implemented separately or jointly. That is, although these possible solutions may be described below separately, two or more of these possible solutions may be implemented in one combination or another.

In current NR framework, cross-carrier scheduling for UCI transmission (e.g., PUCCH) using dynamic indication and semi-static configuration have been specified in 3GPP Release 17. In a TDD system, the uplink/downlink TDD pattern is the bottleneck for the URLLC latency. TDD allows uplink and downlink to use the entire frequency spectrum, but in different time slots. Time is divided up into short slots and some are designated for uplink while others are designated for downlink. This approach enables asymmetric traffic and time-varying uplink and downlink demands. However, since PUCCH can only be scheduled in uplink slots, in an event that TDD pattern allocate more slots as downlink slots, the duration between uplink slots will be drawn too long and cause long latency. The worst case PUCCH alignment delay is dominated by the length of downlink and uplink and may be prohibitive to apply URLLC retransmission. Therefore, there is a need to introduce cross-carrier scheduling and repetition on PUCCH transmission and enhance UCI transmission for URLLC or other latency-critical applications.

In view of the above, the present disclosure proposes a number of schemes pertaining to PUCCH carrier/cell switching and PUCCH repetitions for latency reduction and UCI transmission enhancement with respect to the UE and the network apparatus (e.g., base station). According to the schemes of the present disclosure, a CA system of TDD carriers with an appropriate time offset between uplink slots on different CCs is supported. The UE can be configured with dynamic or semi-static cross-carrier scheduling for PUCCH. Switching of CC used for PUCCH can help to reduce the latency for CA with two or multiple carriers having different TDD patterns. Accordingly, by applying the schemes of the present disclosure, the performance of UCI transmission can be improved to reduce alignment delay/latency. Applications with URLLC requirements can benefit from the enhancements achieved by the implementations of the present disclosure.

FIG. 1 illustrates example scenario 100 under schemes in accordance with implementations of the present disclosure. Scenario 100 involves a UE and a plurality of network nodes, which may be a part of a wireless communication network (e.g., an LTE network, a 5G network, an NR network, an IoT network or an NB-IoT network). Scenario 100 illustrates an example of dynamic PUCCH carrier/cell switching and PUCCH repetition. The UE may be configured with a plurality of CCs or cells such as CC 1 which corresponds to a primary cell (PCell) and CC 2 which corresponds to a secondary cell (SCell) or PUCCH-sSCell. A first numerology of the CC 1 may be different from or identical to a second numerology of the CC 2.

In addition, CC 1 and CC 2 may have identical or different TDD patterns for uplink/downlink slots. For example, the ration of downlink slot to uplink slot is 3:1 for CC 1 and 1:3 for CC 2. To reduce latency, the UE may be configured with dynamic switching of CC or cell used for PUCCH transmission and repetition.

Specifically, the UE may receive downlink control information (DCI) on a physical downlink control channel (PDCCH) configuring a carrier switching indication and a PUCCH repetition indication. The UE may further receive downlink data on a physical downlink shared channel (PDSCH). The UE may perform a PUCCH carrier switching or a PUCCH cell switching according to the carrier switching indication when transmitting uplink control information (UCI) corresponding to the downlink data. The UE may further perform a PUCCH repetition by retransmitting the UCI according to the PUCCH repetition indication.

The carrier switching indication includes a CC or a cell having earlier uplink slot for transmitting uplink control information (UCI) when performing the PUCCH carrier switching or the PUCCH cell switching. The PDSCH is transmitted on one of a primary cell (PCell) and a secondary cell (SCell), and the UCI is transmitted on one of the PCell and a PUCCH switching secondary cell (PUCCH-sSCell). For example, reference is made to FIG. 1, the UE may receive downlink data on CC1 which corresponds to the PCell, if the earliest uplink slot is on CC2 which corresponds to PUCCH-sSCell, the base station may dynamically configure/indicate the PUCCH carrier switching. Therefore, the UE may perform the PUCCH carrier switching or the PUCCH cell switching by switching from the PCell to the PUCCH-sSCell according to the carrier switching indication when transmitting UCI corresponding to the downlink data.

In some implementations, PUCCH carrier switching or the PUCCH cell switching has dependency on uplink carrier aggregation (UL CA). Hence, the UE supporting PUCCH carrier switching or PUCCH cell switching need to also support the 3GPP Release 15 UL CA in the same Band Combination as a mandatory condition. In other implementations, PUCCH carrier switching or PUCCH cell switching may not have dependency on UL CA. Hence, the UE supporting PUCCH carrier switching does not need to support the 3GPP Release 15 UL CA in the same band combination as a mandatory condition.

In some implementations, the PUCCH carrier switching time or the PUCCH cell switching is defined. The UE may report the supported PUCCH carrier switching times to the cells within the PUCCH cell group. The base station may configure the UE (e.g., via RRC signaling) with PUCCH carrier switching time. PUCCH carrier switching times or PUCCH cell switching times could be defined per band combination. In some implementations, UL Tx switching time requirement in Release 16 is applied to PUCCH carrier switching or PUCCH cell switching. In some implementations, UEs supporting PUCCH carrier switching or PUCCH cell switching need to also support the Rel-16 UL Tx switching. In some implementations, UEs supporting PUCCH carrier switching or PUCCH cell switching need to also support the Rel-16 UL Tx switching in the same band combination.

In NR framework, DCI format 0_0 and DCI format 1_0 are fallback DCI formats, and DCI format 0_1 and DCI format 1_1 are non-fallback DCI formats. In some implementations, the DCI is a fallback DCI. In some implementations, dynamic PUCCH carrier switching or PUCCH cell switching is not supported by fall-back DCI format 1_0, only semi-static PUCCH carrier switching or semi-static PUCCH cell switching is supported for the fall-back DCI format 1_0. In an event that the dynamic PUCCH carrier switching or PUCCH cell switching is enabled, and non-fall-back DCI format 1_1 and fall-back DCI format 1_0 are scheduling data and both pointing towards the same HARQ-ACK codebook, then the PUCCH carrier signaled by the DCI format 1_1 is used.

To further enhance UCI transmission, PUCCH repetitions may be introduced to the dynamic PUCCH carrier switching or PUCCH cell switching. The PUCCH repetition indication configured via DCI may include the number of the PUCCH repetitions. The UE may perform PUCCH repetition by retransmitting transmitting the UCI according to the PUCCH repetition indication. Besides, when performing the PUCCH repetition, all the retransmitted UCI are transmitted on the CC indicated in the DCI. In other words, PUCCH carrier switching and PUCCH repetition may coexist if the carrier switching indication is dynamically configured to UE via DCI.

In addition, the CC or the cell configured through carrier switching indication in DCI is applicable for PUCCH repetition. Once the CC or the cell is configured, all PUCCH repetitions can be transmitted on the same CC indicated in the DCI. For example, reference is made to FIG. 1, after the UE performs the PUCCH carrier switching when transmitting UCI corresponding to the downlink data, the UE may further repeatedly transmit the UCI on PUCCH-sSCell in slots S1, S3, S4 and S5 according to the PUCCH repetition indication in the DCI.

In some implementations, the DCI indicates a PUCCH resource indicator (PRI) for the PUCCH repetitions. If the PUCCH carrier switching or PUCCH cell switching is dynamic PUCCH carrier switching or dynamic PUCCH cell switching, all PUCCH repetitions can use the same PRI indicated in the DCI indicating the PUCCH carrier.

In some implementations, with the dynamic PUCCH carrier switching or dynamic PUCCH cell switching, first PUCCH transmission may follow the CC or the cell indicated in the DCI and the remaining repetitions follow the PUCCH timing pattern. In some implementations, with the dynamic PUCCH carrier switching or dynamic PUCCH cell switching, first PUCCH transmission follows the CC (e.g., CC2) or the cell (e.g., PUCCH-sSCell) indicated in the DCI and the remaining repetitions follow a defined rule for PUCCH carrier selection. In some implementations, with the dynamic PUCCH carrier switching or dynamic PUCCH cell switching, first PUCCH transmission follows the CC (e.g., CC2) or the cell (e.g., PUCCH-sSCell) indicated in the DCI and remaining PUCCH repetitions fall-back to a specified or configured cell (e.g., PCell or and RRC configured cell).

In some implementations, the PUCCH repetitions may be support with dynamic PUCCH carrier switching only for CCs with the same numerology. In some implementations, PUCCH repetitions may be support with dynamic PUCCH carrier switching only for CCs with the same numerology and the same slot/sub-slot configurations. In some implementations, PUCCH repetitions may be support with dynamic PUCCH carrier switching or dynamic PUCCH cell switching. In case of sub-slot configuration, some PUCCH repetitions can take place on one PUCCH carrier (one the indicated slot from the DCI) and the remaining repetitions could take place on different PUCCH carriers, on the following slots on other PUCCH carriers. In some implementations, PUCCH repetitions is supported with dynamic PUCCH carrier switching only for HARQ feedback. In some implementations, PUCCH repetitions may not be supported with dynamic PUCCH carrier switching for channel state information (CSI) and scheduling request (SR).

Under the proposed scheme of the present disclosure pertaining to PUCCH carrier switching for latency reduction and UCI transmission enhancement with respect to the UE and the network apparatus. According to the schemes of the present disclosure, a CA system of TDD carriers with an appropriate time offset between uplink slots on different CCs or cells is supported. The UE can be configured with semi-static cross-carrier scheduling for PUCCH. Switching of CC used for PUCCH can help to reduce the latency for CA with two or multiple carriers having different TDD patterns. Accordingly, by applying the schemes of the present disclosure, the performance of UCI transmission can be improved to reduce alignment delay/latency. Applications with URLLC requirements can benefit from the enhancements achieved by the implementations of the present disclosure.

Figure 2:
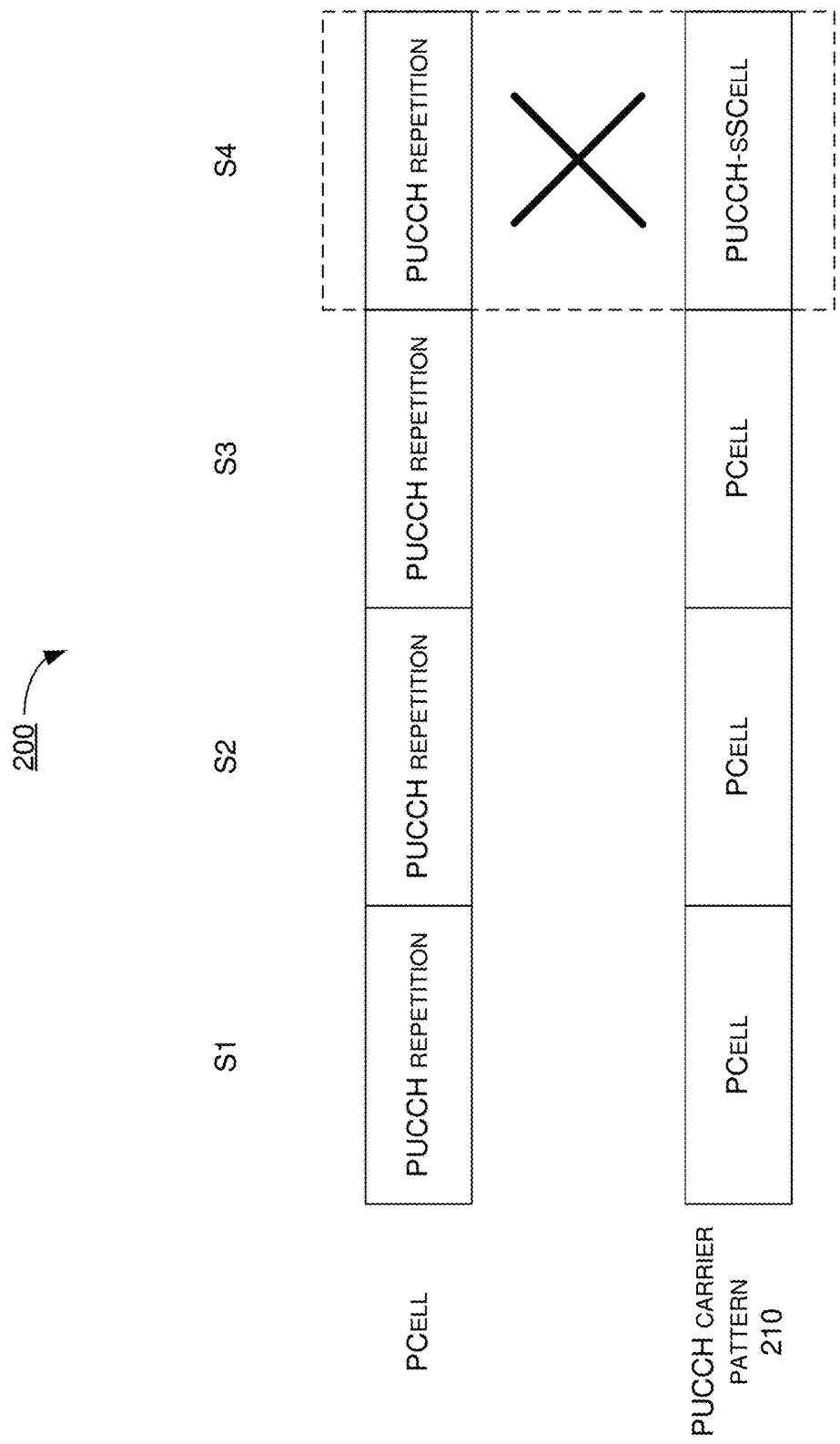
FIG. 2 is a diagram depicting an example scenario under schemes in accordance with implementations of the present disclosure.

FIG. 2 illustrates example scenario 200 under schemes in accordance with implementations of the present disclosure. Scenario 200 involves a UE and a plurality of network nodes, which may be a part of a wireless communication network (e.g., an LTE network, a 5G network, an NR network, an IoT network or an NB-IoT network). Scenario 200 illustrates an example of PUCCH repetition and semi-static cross-carrier scheduling for PUCCH. Specifically, the UE may receive a PDCCH. The UE may further receive downlink data on a PDSCH according to the PDCCH. Then, the UE may perform a PUCCH repetition corresponding to the PDSCH according to a restriction. The restriction includes no semi-static PUCCH carrier switching or no semi-static PUCCH cell switching for the PUCCH repetition.

When performing the PUCCH repetition, the UE transmits all PUCCH repetitions on a single cell. The single cell is the PCell or the PUCCH-sSCell. For example, as shown in FIG. 2, the base station may configure the PUCCH repetition resources in slot S1-S4. When performing PUCCH repetition, the UE transmits all UCI on PCell. In addition, the UE may further receive a PUCCH carrier pattern 210 or a PUCCH cell pattern configured in a time domain including a plurality of slots.

The UE assumes there is no PUCCH scheduling on multiple slots mapped to PCell and PUCCH-sSCell. The base station needs to schedule carefully so there is no such case where a PUCCH repetition from PCell would be needed to transmit in a slot (e.g., slot S4 shown in FIG. 2) indicated by the PUCCH carrier pattern or the PUCCH cell pattern for PUCCH transmission on PUCCH-sSCell. In other words, the PUCCH carrier pattern or the PUCCH cell pattern indicates the same bit values for all slots used for the PUCCH repetition.

The PUCCH carrier pattern or the PUCCH cell pattern is configured in a time domain including a plurality of slots, and each of the slots is mapping to the PCell or the PUCCH-sSCell. The PCell and the SCell may be configured with the same or different numerologies.

In some implementations, PUCCH carrier switching have dependency on uplink carrier aggregation (UL CA). Hence, the UE supporting PUCCH carrier switching need to also support the 3GPP Release 15 UL CA in the same Band Combination as a mandatory condition. In other implementations, PUCCH carrier switching may not have dependency on UL CA. Hence, the UE supporting PUCCH carrier switching does not need to support the 3GPP Release 15 UL CA in the same Band Combination as a mandatory condition.

In some implementations, the PUCCH carrier switching time is defined. The UE may report the supported PUCCH carrier switching times to the cells with the cell group. The base station may configure the UE (e.g., via RRC signaling) with PUCCH carrier switching time. PUCCH carrier switching times could be defined per band combination. In some implementations, UL Tx switching time requirement in Release 16 is applied to PUCCH carrier switching. In some implementations, UEs supporting PUCCH carrier switching need to also support the Release 16 UL Tx switching. In some implementations, UEs supporting PUCCH carrier switching need to also support the Rel-16 UL Tx switching in the same band combination.

In NR framework, DCI format 0_0 and DCI format 1_0 are fallback DCI formats, and DCI format 0_1 and DCI format 1_1 are non-fallback DCI formats. In some implementations, the PUCCH carrier pattern or the PUCCH cell pattern is configured according to DCI format. In other words, the PUCCH carrier pattern or the PUCCH cell pattern for semi-static PUCCH carrier switching is configured per DCI format. In some implementations, a specific PUCCH carrier is configured via RRC signalling to be used for data scheduled by the fall-back DCI format 1_0. The fall-back DCI format 1_0 can fall back to this rule if non-fallback DCI format 1_1 is scheduling data and mapping to the same PUCCH. In some implementations, only semi-static PUCCH carrier switching is supported for the fall-back DCI format 1_0, and dynamic PUCCH carrier switching is not supported by DCI format 1_0.

In an event that PUCCH repetition is supported with semi-static PUCCH carrier switching, PUCCH repetitions are transmitted on a specified or configured cell (e.g., PCell or RRC configured cell).

In some implementations, the PUCCH repetitions may be support with semi-static PUCCH carrier switching only for CCs with the same numerology. In some implementations, PUCCH repetitions may be support with semi-static PUCCH carrier switching only for CCs with the same numerology and the same slot/sub-slot configurations. In some implementations, PUCCH repetitions may be support with semi-static PUCCH carrier switching. In case of sub-slot configuration, some PUCCH repetitions can take place on one PUCCH carrier (one the indicated slot from the PUCCH carrier pattern) and the remaining repetitions could take place on different PUCCH carriers, on the following slots on other PUCCH carriers. In some implementations, PUCCH repetitions is supported with semi-static PUCCH carrier switching only for HARQ feedback. In some implementations, PUCCH repetitions may not be supported with semi-static PUCCH carrier switching for channel state information (CSI) and scheduling request (SR).

Illustrative Implementations

Figure 3:
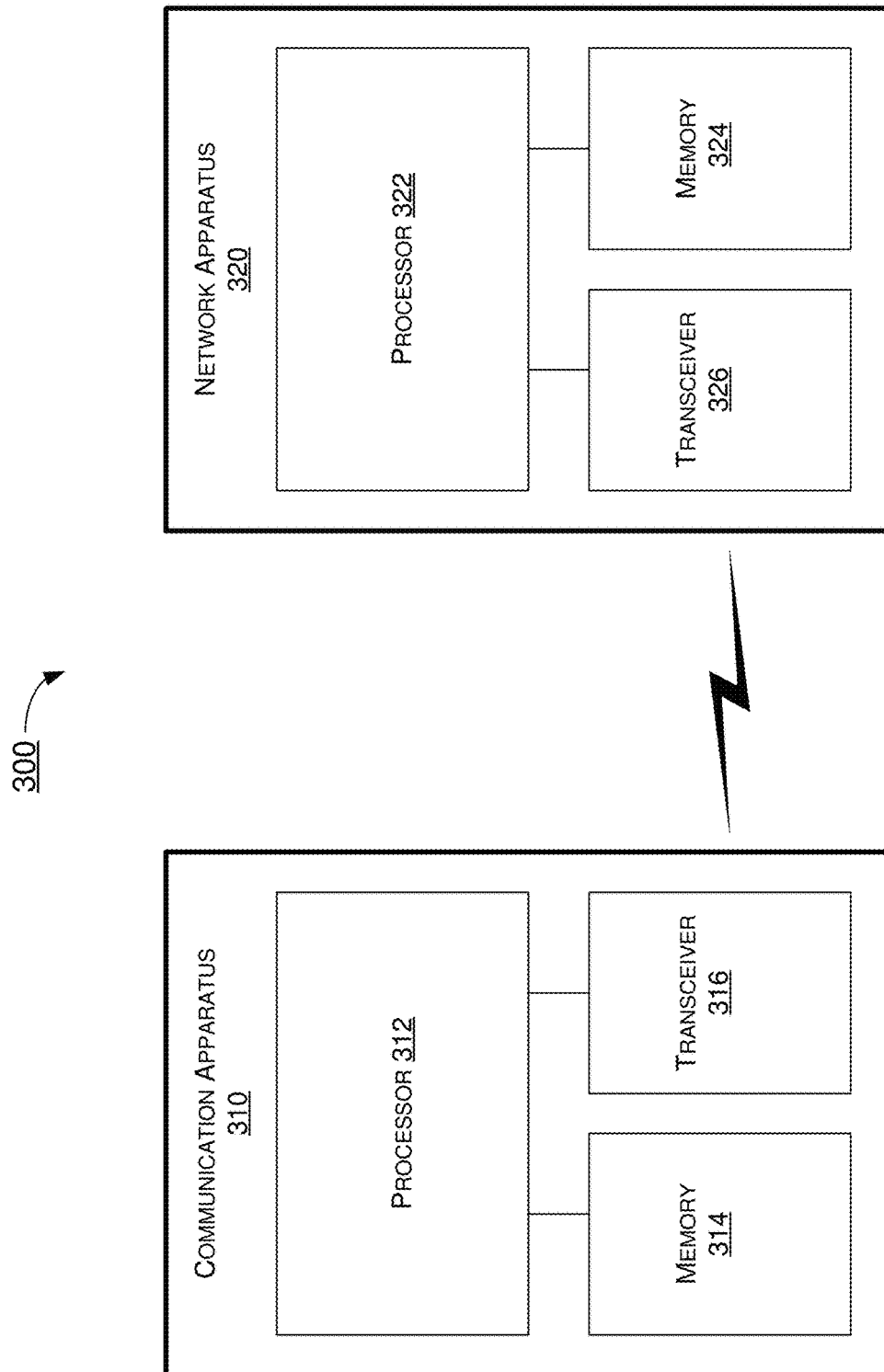
FIG. 3 is a block diagram of an example communication system in accordance with an implementation of the present disclosure.

FIG. 3 illustrates an example communication system 300 having an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to PUCCH carrier switching and PUCCH repetitions for latency enhancement and UCI transmission enhancement with respect to user equipment and network apparatus in wireless communications, including scenarios/schemes described above as well as processes 400 and 500 described below.

Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 310 may include at least some of those components shown in FIG. 3 such as a processor 312, for example. Communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a base station, a small cell, a router or a gateway. For instance, network apparatus 320 may be implemented in an eNodeB in an LTE, LTE-Advanced or LTE-Advanced Pro network or in a gNB in a 5G, NR, IoT, NB-IoT or IIoT network. Alternatively, network apparatus 320 may be implemented in the form of one or more IC chips such as, for example and without limitation, one or more single-core processors, one or more multi-core processors, or one or more RISC or CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including dynamic PUCCH carrier switching with PUCCH repetitions and semi-static PUCCH carrier switching for latency enhancement with respect to user equipment and network apparatus in mobile communications in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

Under various proposed scheme in accordance with the present disclosure pertaining to dynamic PUCCH carrier switching and PUCCH repetitions, processor 312 may receive, via transceiver 316, a downlink control information (DCI) on a physical downlink control channel (PDCCH) configuring a carrier switching indication and a PUCCH repetition indication. Processor 312 may receive, via transceiver 316, downlink data on a physical downlink shared channel (PDSCH). Then, processor 312 may perform a PUCCH carrier switching or a PUCCH cell switching according to the carrier switching indication when transmitting uplink control information (UCI) corresponding to the downlink data. The processor 312 may perform a PUCCH repetition by retransmitting the UCI.

In some implementations, the carrier switching indication includes a component carrier (CC) or a cell for transmitting the UCI when performing the PUCCH carrier switching or the PUCCH cell switching.

In some implementations, when performing the PUCCH repetition, all the retransmitted UCI are transmitted on the CC indicated in the DCI.

In some implementations, the PUCCH carrier switching or the PUCCH cell switching is dynamically configured by the network apparatus 320.

In some implementations, the PUCCH repetition indication comprises a number of the PUCCH repetition.

In some implementations, the PDSCH is transmitted on one of the PCell and the PUCCH-sSCell.

In some implementations, the DCI indicates a PUCCH resource indicator (PRI) for the PUCCH repetitions Under various proposed scheme in accordance with the present disclosure pertaining to semi-static PUCCH carrier switching using PUCCH carrier pattern and PUCCH repetition, processor 312 may receive, via transceiver 316, a physical downlink control channel (PDCCH). Processor 312 may receive, via transceiver 316, downlink data on a physical downlink shared channel (PDSCH) according to the PDCCH. Then, processor 312 may perform a PUCCH repetition corresponding to the PDSCH according to a restriction. The restriction includes no semi-static PUCCH carrier switching or no semi-static PUCCH cell switching for the PUCCH repetition.

In some implementations, the performing of the PUCCH repetition comprises transmitting all PUCCH repetitions on a single cell. The single cell is a primary cell (PCell) or a PUCCH switching secondary cell (PUCCH-sSCell).

In some implementations, the processor 312 may receive a PUCCH carrier pattern or a PUCCH cell pattern configured in a time domain including a plurality of slots. The PUCCH carrier pattern or the PUCCH cell pattern indicates the same bit values for all slots used for the PUCCH repetition.

In some implementations, the slots are mapping to the PCell or the PUCCH-sSCell.

Illustrative Processes

Figure 4:
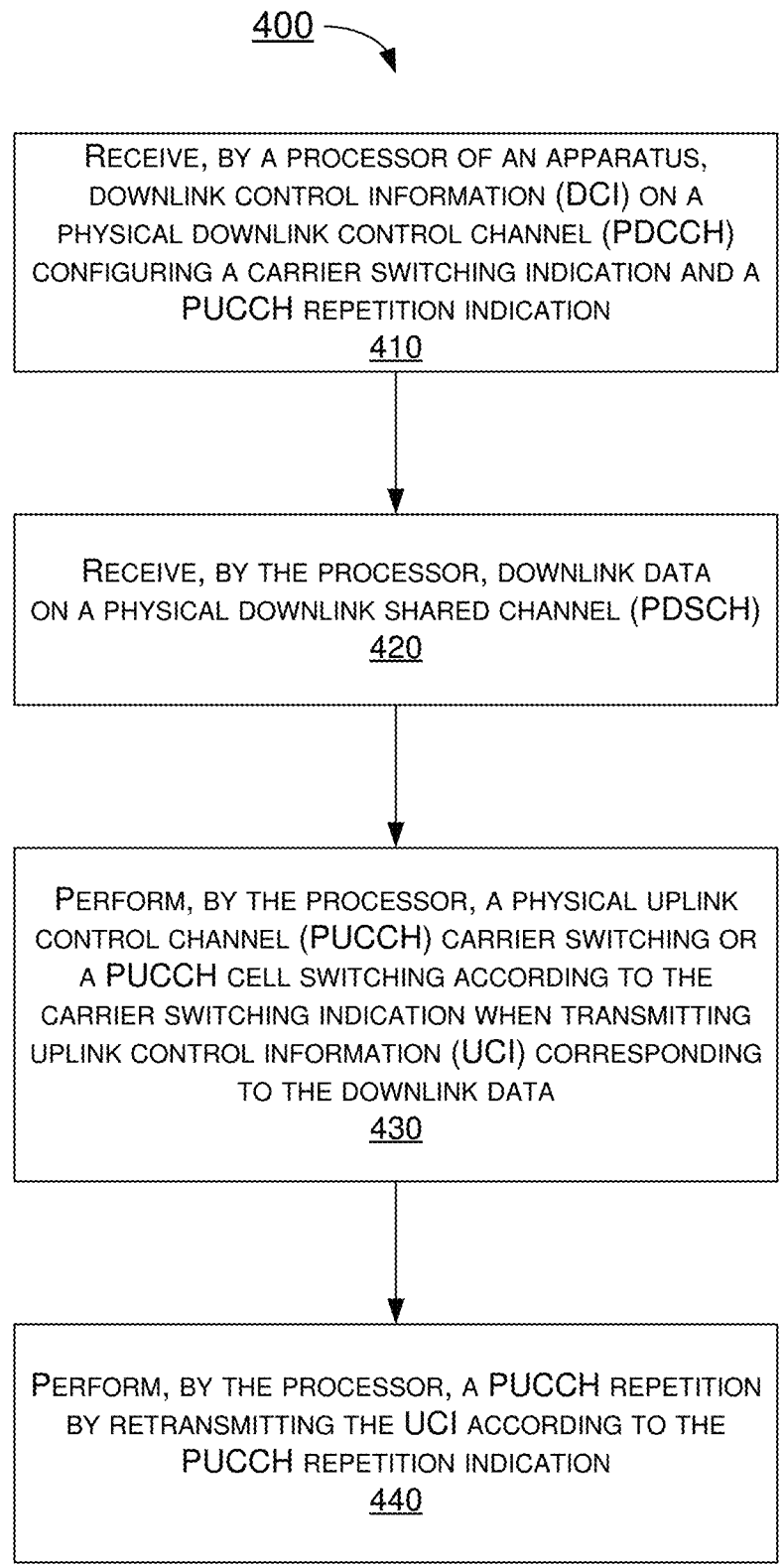
FIG. 4 is a flowchart of an example process in accordance with an implementation of the present disclosure.

FIG. 4 illustrates an example process 400 in accordance with an implementation of the present disclosure. Process 400 may be an example implementation of schemes described above, whether partially or completely, with respect to dynamic PUCCH carrier switching and PUCCH repetitions for latency enhancement with the present disclosure. Process 400 may represent an aspect of implementation of features of communication apparatus 310. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At block 410, process 400 may involve processor 312 of apparatus 310 receiving downlink control information (DCI) on a physical downlink control channel (PDCCH) configuring a carrier switching indication and a PUCCH repetition indication. Process 400 may proceed from block 410 to block 420.

At block 420, process 400 may involve processor 312 receiving downlink data on a physical downlink shared channel (PDSCH). Process 400 may proceed from block 420 to block 430.

At block 430, process 400 may involve processor 312 performing a PUCCH carrier switching or a PUCCH cell switching according to the carrier switching indication when transmitting uplink control information (UCI) corresponding to the downlink data. Process 400 may proceed from block 430 to block 440.

At block 440, process 400 may involve processor 312 performing a PUCCH repetition by retransmitting the UCI according to the PUCCH repetition indication.

In some implementations, the carrier switching indication includes a component carrier (CC) or a cell for transmitting the UCI when performing the PUCCH carrier switching or the PUCCH cell switching.

In some implementations, when performing the PUCCH repetition, all the retransmitted UCI are transmitted on the CC indicated in the DCI.

In some implementations, the PUCCH carrier switching or the PUCCH cell switching is dynamically configured.

In some implementations, the PUCCH repetition indication includes a number of the PUCCH repetitions.

In some implementations, the PDSCH is transmitted on one of a primary cell (PCell) and a secondary cell (SCell), and the UCI is transmitted on one of the PCell and a PUCCH switching secondary cell (PUCCH-sSCell).

In some implementations, the DCI indicates a PUCCH resource indicator (PRI) for the PUCCH repetitions.

In some implementations, the DCI is a fallback DCI.

Figure 5:
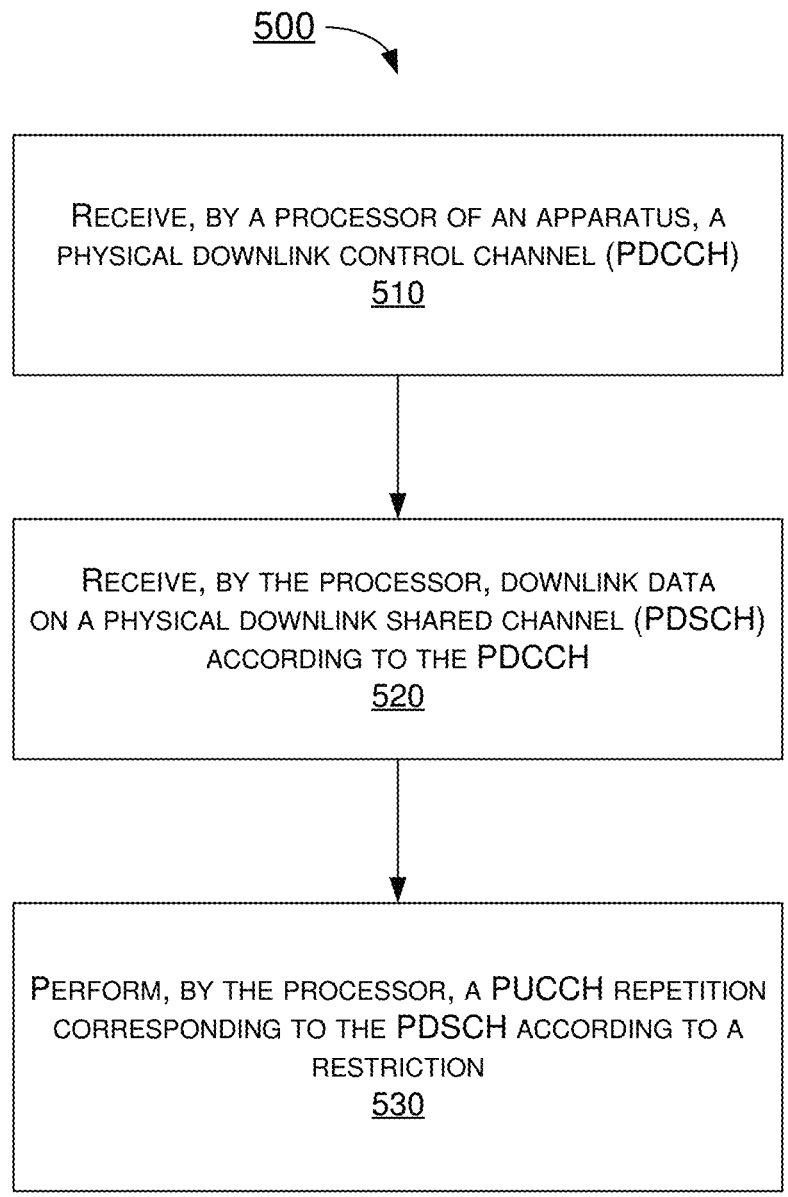
FIG. 5 is a flowchart of an example process in accordance with an implementation of the present disclosure.

FIG. 5 illustrates an example process 500 in accordance with an implementation of the present disclosure. Process 500 may be an example implementation of schemes described above, whether partially or completely, with respect to semi-static PUCCH carrier switching for UCI transmission enhancement with the present disclosure. Process 500 may represent an aspect of implementation of features of communication apparatus 310. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 310 or any suitable UE or machine type devices. Solely for illustrative purposes and without limitation, process 500 is described below in the context of communication apparatus 310. Process 500 may begin at block 510.

At 510, process 500 may involve processor 312 of apparatus 310 receiving a physical downlink control channel (PDCCH). Process 500 may proceed from 510 to 520.

At 520, process 500 may involve processor 312 receiving downlink data on a physical downlink shared channel (PDSCH) according to the PDCCH. Process 500 may proceed from 520 to 530.

At 530, process 500 may involve processor 312 performing a PUCCH repetition corresponding to the PDSCH according to a restriction. The restriction includes no semi-static PUCCH carrier switching or no semi-static PUCCH cell switching for the PUCCH repetition.

In some implementations, the performing of the PUCCH repetition includes transmitting all PUCCH repetitions on a single cell. The single cell is a primary cell (PCell) or a PUCCH switching secondary cell (PUCCH-sSCell).

In some implementations, process 500 may involve processor 312 receiving a PUCCH carrier pattern configured in a time domain including a plurality of slots. The PUCCH carrier pattern indicates the same bit values for all slots used for the PUCCH repetition.

In some implementations, the slots are mapping to the PCell or the PUCCH-sSCell.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus, downlink control information (DCI) on a physical downlink control channel (PDCCH) configuring a carrier switching indication and a PUCCH repetition indication;
   receiving, by the processor, downlink data on a physical downlink shared channel (PDSCH);
   performing, by the processor, a PUCCH carrier switching or a physical uplink control channel (PUCCH) cell switching according to the carrier switching indication when transmitting uplink control information (UCI) corresponding to the downlink data; and
   performing, by the processor, a PUCCH repetition by retransmitting the UCI according to the PUCCH repetition indication,
   wherein the carrier switching indication comprises a component carrier (CC) or a cell for transmitting the UCI when performing the PUCCH carrier switching or the PUCCH cell switching, and
   wherein when performing the PUCCH repetition, all the retransmitted UCI are transmitted on the CC indicated in the DCI.

2. The method of claim 1, wherein the PUCCH carrier switching or the PUCCH cell switching is dynamically configured.

3. The method of claim 1, wherein the PUCCH repetition indication comprises a number of the PUCCH repetitions.

4. The method of claim 1, wherein the PDSCH is transmitted on one of a primary cell (PCell) and a secondary cell (SCell), and wherein the UCI is transmitted on one of the PCell and a PUCCH switching secondary cell (PUCCH-sSCell).

5. The method of claim 1, wherein the DCI indicates a PUCCH resource indicator (PRI) for the PUCCH repetitions.

6. The method of claim 1, wherein the DCI is a fallback DCI.

7. A method, comprising:
- receiving, by a processor of an apparatus, a physical downlink control channel (PDCCH);
- receiving, by the processor, downlink data on a physical downlink shared channel (PDSCH) according to the PDCCH;
- performing, by the processor, a physical uplink control channel (PUCCH) repetition corresponding to the PDSCH according to a restriction;
- receiving, by the processor, a PUCCH carrier pattern or a PUCCH cell pattern configured in a time domain comprising a plurality of slots,
- wherein the restriction comprises no semi-static PUCCH carrier switching or no semi-static PUCCH cell switching for the PUCCH repetition, and
- wherein the PUCCH carrier pattern or the PUCCH cell pattern indicates the same bit values for all slots used for the PUCCH repetition.

8. The method of claim 7, wherein the performing of the PUCCH repetition comprises transmitting all PUCCH repetitions on a single cell.

9. The method of claim 8, wherein the single cell is a primary cell (PCell) or a PUCCH switching secondary cell (PUCCH-sSCell).

10. The method of claim 7, wherein the slots are mapped to the PCell or the PUCCH-sSCell.

11. An apparatus, comprising:
- a transceiver which, during operation, wirelessly communicates with a network node of a wireless network; and
- a processor communicatively coupled to the transceiver to perform operations comprising:
  - receiving, via the transceiver, a downlink control information (DCI) on a physical downlink control channel (PDCCH) configuring a carrier switching indication and a PUCCH repetition indication;
  - receiving, via the transceiver, downlink data on a physical downlink shared channel (PDSCH);
  - performing a PUCCH carrier switching or a physical uplink control channel (PUCCH) cell switching according to the carrier switching indication when transmitting uplink control information (UCI) corresponding to the downlink data; and
  - performing a PUCCH repetition by retransmitting the UCI according to the PUCCH repetition indication,
- wherein, in performing the PUCCH carrier switching or the PUCCH cell switching, the carrier switching indication comprises a component carrier (CC) or a cell for transmitting the UCI, and
- wherein, in performing the PUCCH repetition, all the retransmitted UCI are transmitted on the CC indicated in the DCI.

12. The apparatus of claim 11, wherein the PUCCH carrier switching or the PUCCH cell switching is dynamically configured.

13. The apparatus of claim 11, wherein the PUCCH repetition indication comprises a number of the PUCCH repetition.

14. The apparatus of claim 11, wherein the PDSCH is transmitted on one of a primary cell (PCell) and a secondary cell (SCell), and wherein the UCI is transmitted on one of the PCell and a PUCCH switching secondary cell (PUCCH-sSCell).

15. The apparatus of claim 11, the DCI indicates a PUCCH resource indicator (PRI) for the PUCCH repetitions.

* * * * *